US012722311B2

(12) United States Patent
Heinzmann et al.

(10) Patent No.: US 12,722,311 B2
(45) Date of Patent: Sep. 1, 2026

(54) METHOD FOR HANDLING A GRIPPING OBJECT BY MEANS OF A VACUUM HANDLING DEVICE, AND VACUUM HANDLING DEVICE

(71) Applicant: J.Schmalz GmbH, Glatten (DE)

(72) Inventors: Bernd Heinzmann, Loßburg (DE); Matthias Frey, Sulz-Dürrenmettstetten (DE); Martin Stehle, Haigerloch (DE); Hermann Reinisch, Dornhan (DE)

(73) Assignee: J. Schmalz GmbH, Glatten (DE)

( * ) Notice: Subject to any disclaimer, the term of this patent is extended or adjusted under 35 U.S.C. 154(b) by 38 days.

(21) Appl. No.: 19/066,696

(22) Filed: Feb. 28, 2025

(65) Prior Publication Data

US 2025/0276454 A1 Sep. 4, 2025

(30) Foreign Application Priority Data

Mar. 1, 2024 (DE) ..................... 10 2024 105 992.3

(51) Int. Cl.
*B25J 15/06* (2006.01)
*B25J 9/16* (2006.01)
*B25J 15/00* (2006.01)

(52) U.S. Cl.
CPC ......... *B25J 15/0616* (2013.01); *B25J 9/1612* (2013.01); *B25J 9/1653* (2013.01); *B25J 15/0052* (2013.01)

(58) Field of Classification Search
CPC .... B25J 15/0616; B25J 9/1612; B25J 9/1653; B25J 15/0052; B66C 1/0212; B66C 1/0243; B66C 1/0256; G05B 2219/39558
See application file for complete search history.

(56) References Cited

U.S. PATENT DOCUMENTS 9,205,558 B1 12/2015 Zevenbergen et al.
2011/0254298 A1 10/2011 Lomerson, Jr.
(Continued)

FOREIGN PATENT DOCUMENTS

DE 689 03 694 T2 4/1993
DE 10 2017 110 998 A1 11/2018
(Continued)

*Primary Examiner* — Jason Holloway
(74) *Attorney, Agent, or Firm* — ASLAN LAW, P.C.

(57) ABSTRACT

A method for handling a gripping object by a vacuum handling device, comprising a vacuum gripper with a plurality of individually activatable suction points and a vacuum generating device, comprising providing a reference negative pressure value $pU_{ref}$, which represents a negative pressure $pU_{test}$ that occurs when a number $n_{test}$ of suction points is activated during open suction without a gripping object in a suction flow path, $n_{test}$ is less than or equal to the difference between $n_{greif}$ and $n_{erf}$, $n_{greif}$ represents the number of suction points $S_{greif}$ used to grip the gripping object through suction, $n_{erf}$ represents the minimum number of suction points required to hold the gripping object securely on the vacuum gripper; activating the suction points $S_{greif}$ and applying suction to the gripping object; measuring a negative pressure value $pU_{ist}$, which represents a negative pressure that occurs in the suction flow path.

13 Claims, 3 Drawing Sheets

(56) References Cited

U.S. PATENT DOCUMENTS

| | | | | |
|---|---|---|---|---|
| 2016/0280471 | A1* | 9/2016 | Schwartz | B65G 47/91 |
| 2017/0087718 | A1* | 3/2017 | Wagner | B25J 15/0658 |
| 2020/0376659 | A1 | 12/2020 | Diankov et al. | |
| 2022/0339800 | A1 | 10/2022 | Poteet et al. | |
| 2023/0182293 | A1 | 6/2023 | Shaw et al. | |
| 2024/0408770 | A1* | 12/2024 | Cagnac | B25J 15/065 |
| 2025/0128432 | A1* | 4/2025 | Schaaf | B25J 19/005 |

FOREIGN PATENT DOCUMENTS

| | | | |
|---|---|---|---|
| DE | 10 2020 006 157 | B3 | 3/2022 |
| DE | 10 2023 107 723 | B3 | 5/2024 |
| EP | 2 522 471 | A1 | 11/2012 |

* cited by examiner

METHOD FOR HANDLING A GRIPPING OBJECT BY MEANS OF A VACUUM HANDLING DEVICE, AND VACUUM HANDLING DEVICE

CROSS-REFERENCE TO RELATED APPLICATIONS

This application claims priority to German (DE) Patent Application No. 10 2024 105 992.3 filed on Mar. 1, 2024, the entire contents of which are hereby incorporated by reference.

The invention relates to a method for handling a gripping object by means of a vacuum handling device and to a vacuum handling device designed for this purpose.

Vacuum handling devices are known in many different ways from the prior art and are used, for example, to handle stacked, rigid, and/or flexible objects. Such vacuum handling devices usually comprise a vacuum gripper and a vacuum generating device for supplying negative pressure to the vacuum gripper.

For example, so-called surface vacuum grippers are known, which have a plurality of suction points on one suction side for picking up an object by suction force. The suction points may be provided, for example, by through-openings in a suction plate. It is also conceivable that the through-openings are equipped with suction bodies, e.g., elastomer suction cups.

To enable the gripping of differently shaped and/or differently sized objects in an efficient manner, surface vacuum grippers are known in which the suction points can be activated individually. To grip an object, for example, only a subset of the suction points can be activated, in particular those which lie within an area defined by the outer contour of the gripping object.

In such vacuum grippers with individually activatable suction points, it is known to monitor each suction point with a dedicated sensor in order to detect malfunctions, for example. However, such a structure is complex and costly in terms of construction.

Based on this, the invention addresses the problem of improving the handling of gripping objects using vacuum handling devices of the type mentioned at the outset. In particular, the aim is to achieve reliable and safe gripping of gripping objects in a structurally simple manner.

This object is achieved according to the invention by a method having the features of claim 1. The method relates to the handling of a gripping object, in particular a workpiece, using a vacuum handling device. In this respect, the method is also a method for operating a vacuum handling device.

The vacuum handling device comprises a vacuum gripper with a plurality of suction points that can be activated and deactivated individually, i.e., independently of one another. The suction points can therefore be independently switched between an active configuration (suction configuration) and a passive configuration. In the active configuration, an inflow of suction air through the suction point is enabled, thus allowing suction to be applied in particular to a gripping object positioned at the suction point. In the passive configuration, the inflow of suction air through the suction point is interrupted, and therefore no air is drawn in through the suction point.

The vacuum handling device further comprises a vacuum generating device for supplying the vacuum gripper with negative pressure. The vacuum generating device is fluidly connected to the vacuum gripper, in particular to the suction points, by a suction flow path in order to supply the vacuum gripper, in particular the suction points, with negative pressure. The suction flow path leads in particular from the vacuum gripper, in particular from each suction point, in the direction of the vacuum generating device. The suction flow path may extend through fluid lines that connect the vacuum gripper to the vacuum generating device. The vacuum generating device may be configured in various ways, for example as a blower, pump, or ejector, preferably as an ejector. Preferably, the vacuum generating device is designed such that when no suction point is activated, i.e., all suction points are in the passive configuration, a constant negative pressure occurs in the suction flow path.

The vacuum handling device preferably also comprises a sensor device for measuring a negative pressure in the suction flow path. The sensor device may comprise one or more pressure sensors. The sensor device may be configured to measure a negative pressure in the vacuum generating device, for example at a suction opening or a suction chamber of the vacuum generating device. Alternatively or additionally, the sensor device may be configured to measure a negative pressure in a fluid line between the vacuum gripper and the vacuum generating device. Alternatively or additionally, the sensor device may be configured to measure a vacuum in the vacuum gripper, for example a suction chamber of the vacuum gripper.

The vacuum handling device may also comprise a control device for controlling the vacuum generating device and/or the vacuum gripper. The control device may, in particular, comprise a non-volatile storage device.

The vacuum gripper is designed, in particular fluidically designed, to carry out the method in such a way, that during open suction without a gripping object, the negative pressure prevailing in the suction flow path depends on the number of activated suction points, wherein the same number of activated suction points-regardless of which suction points from the plurality of suction points are activated-always leads to the same negative pressure in the suction flow path and wherein a different number of activated suction points leads to a different negative pressure in the suction flow path. In this respect, when open suction occurs without a gripping object, there is a clear correlation in particular between a number of activated suction points and a negative pressure that occurs in a suction flow path as a result of the activation of this number of suction points. Such a configuration may be implemented, for example, by ensuring that the flow paths from the individual suction points to the vacuum generating device are identical, in particular having identical path lengths and identical flow cross-sections. However, other embodiments are also conceivable. The specific configuration is ultimately not essential for the method according to the invention.

Furthermore, it may be advantageous if the vacuum gripper is designed such that a change $\Delta pU$ in the negative pressure within the suction flow path, which occurs when an additional suction point is activated, exceeds 10 mbar, in particular exceeds 15 mbar, more particularly exceeds 20 mbar, in particular at least until a third of the existing suction points are extended. This facilitates reliable detection of a malfunction or mishandling of a suction point.

Further optional embodiments and advantages of the vacuum handling device are described below with reference to the vacuum handling device as such, so that, to avoid repetition, reference is made to the disclosure below.

The method comprises the following steps, in particular in the order given:

Storing, in particular saving, a reference negative pressure value $pU_{ref}$ in a non-volatile storage device, for example a non-volatile storage device of a control device of the vacuum handling device. The reference negative pressure value $pU_{ref}$ represents a negative pressure $pU_{test}$ that occurs in the suction flow path when a number $n_{test}$ of suction points is activated and when open suction occurs, i.e., without picking up a gripping object through suction. The reference negative pressure value $pU_{ref}$ may correspond to the negative pressure $pU_{test}$ prevailing in the suction flow path, in particular to a negative pressure measured in the suction flow path. It is also conceivable that the reference negative pressure value $pU_{ref}$ is a negative pressure value derived from the negative pressure $pU_{test}$. For example, it is conceivable that the reference negative pressure value $pU_{ref}$ may be the negative pressure $pU_{test}$ corrected, in particular reduced, by a correction factor $PU_{korr}$.

Activating the suction points $S_{greif}$ and applying suction to the gripping object with the suction points $S_{greif}$.

Determining a negative pressure value $pU_{ist}$, which represents the negative pressure that occurs in the suction flow path after the gripping object has been suctioned using the suction points $S_{greif}$. Determining the negative pressure value $pU_{ist}$ includes in particular measuring the negative pressure value by means of the sensor device.

Comparing the negative pressure value $pU_{ist}$ with the reference negative pressure value $pU_{ref}$.

(Optional) Moving the gripping object with the vacuum gripper, in particular by means of a manipulator coupled to the vacuum gripper.

According to the invention, the number $n_{test}$ is calculated according to the following formula:

$$n_{test} \geq n_{greif} - n_{erf}, \text{ in particular } n_{test} = n_{greif} - n_{erf}.$$

In this respect, $n_{test}$ is less than or equal to, in particular equal to, the difference between $n_{greif}$ and $n_{erf}$.

$n_{greif}$ represents the number of suction points $S_{greif}$ of the vacuum gripper, by means of which the gripping object is to be gripped later. Therefore the number $n_{greif}$ or the suction points $S_{greif}$ correspond to the desired suction points that are to be activated to grip the gripping object. As explained below, the number $n_{greif}$ of suction points or the specific suction points $S_{greif}$ may be determined depending on a geometry, in particular an outer and/or inner contour, of the gripping object. In particular, the number $n_{greif}$ may correspond to the maximum possible number of suction points that can be used to grip the gripping object based on its geometry.

$n_{erf}$ represents the minimum number of suction points required to hold the gripping object securely, i.e., with a predefined holding force. The number $n_{erf}$ is determined in particular based on the weight of the gripping object and/or a predefined holding force. For example, it is conceivable that gripping object data, including information on the weight of the gripping object, are provided on the control device and, depending on the gripping object data, the number $n_{erf}$ is determined.

The reference negative pressure value $pU_{ref}$ thus represents the negative pressure that would occur if, during a later gripping of the gripping object using the suction points $S_{greif}$, only $n_{greif}-n_{erf}$ of activated suction points failed to or at least did not reliably suction the gripping object, or only $n_{erf}$ of the $n_{greif}$ of activated suction points actually generated suction. The fact that only a subset of the suction points $S_{greif}$, activated for gripping, reliably generates suction, may occur for example if the gripping object is not aligned in the desired position relative to the vacuum gripper and/or if the gripping object has local recesses or irregularities that make suction more difficult (see below for further details). The reference negative pressure $pU_{ref}$ therefore represents a threshold negative pressure, which must be at least achieved during the later activation of the suction points $S_{greif}$ to ensure that the gripping object is securely gripped.

The number $n_{greif}$, especially the suction points $S_{greif}$, and the number $n_{erf}$ can in particular be provided on the storage device. Accordingly, the method may comprise, in particular before providing the reference pressure value, the step of providing, in particular storing, the number $n_{erf}$ of suction points required for securely holding the gripping object and the number $n_{greif}$ of suction points $S_{greif}$ by means of which the gripping object is to be gripped later.

The proposed method makes it possible to estimate, using only a single sensor, whether the gripping object is securely held by the vacuum gripper. The sensor may in particular be a pressure sensor that is already present in the vacuum generating device, thus further reducing structural complexity. In particular, a lower measured negative pressure value $pU_{ist}$ than the reference negative pressure value $pU_{ref}$ can indicate that fewer than the minimum required suction points $n_{erf}$ are reliably gripping (i.e., more suction points than the difference between $n_{greif}$ and $n_{test}$ are not properly generating suction), thus potentially compromising secure holding of the gripping object.

As an advantageous development, if the negative pressure value $pU_{ist}$, measured after applying suction to the gripping object with the suction points $S_{greif}$, is lower than the reference negative pressure value $pU_{ref}$ (i.e., the negative pressure is smaller), an error signal, in particular an error message, may be issued. The error signal can, for example, cause a control device of the vacuum handling device to interrupt the application of suction to the gripping object and, in particular, prevent the gripping object from moving.

It is also conceivable, if the negative pressure value $pU_{ist}$, measured after applying suction to the gripping object with the suction points $S_{greif}$, is greater than the reference negative pressure value $pU_{ref}$, for an enable signal to be issued. The enable signal may, for example, cause a control device of the vacuum handling device to continue applying suction to the gripping object and/or to start or resume an optional work process (see below).

It is conceivable that the reference negative pressure value $pU_{ref}$ for the number $n_{test}$ of suction points is stored in a database of the non-volatile storage device. For example, it is conceivable that a reference database is stored in the storage device and specifies, for each number of activated suction points, a corresponding negative pressure value $pU_{ist}$ that represents the negative pressure in the suction flow path when this number of suction points are activated and open suction occurs. The reference database may be provided by reference measurements, e.g., before commissioning of the vacuum handling device.

Preferably, however, the reference negative pressure value $pU_{ref}$ is determined by means of a reference measurement, especially immediately before activating the suction points $S_{greif}$. In this way, temporal and spatial fluctuations, e.g., due to temperature and/or humidity effects or wear effects, can be taken into account and, in particular, corrected. In addition, a blockage in the suction flow path or an individual suction point can be detected.

The provision of the reference negative pressure value preferably comprises (before activating the suction points $S_{greif}$ for applying suction to the gripping object):

(optional) Providing the number $n_{greif}$ and the number $n_{erf}$, in particular storing the number $n_{greif}$ and the number $n_{erf}$ in a non-volatile storage device;

Activating a number of suction points $S_{test}$ corresponding to $n_{test}$ to perform suction without a gripping object (open suction occurs);

Determining, in particular measuring using the sensor device, a negative pressure value $pU_{test}$, which represents a negative pressure that occurs in the suction flow path after activation of the $n_{test}$ suction points (during open suction);

Storing this negative pressure value $pU_{test}$ or a negative pressure value derived from this negative pressure value $pU_{test}$, for example, this negative pressure value $pU_{test}$ reduced by a correction factor $pU_{korr}$, as the reference negative pressure value $pU_{ref}$ in the non-volatile storage device.

The number $n_{test}$ can be zero. In this case, no suction points can be activated. The number $n_{test}$ can be greater than zero.

As mentioned above, it is conceivable that the number $n_{test}$ of (test) suction points $S_{test}$ is less than the difference between $n_{greif}$ and $n_{erf}$. For example, it is conceivable that $n_{test}=n_{greif}-(n_{erf}+a)$, where a is a natural number greater than or equal to one. Therefore, for the reference measurement, it can be simulated that more suction points are required than are actually necessary for secure gripping. In this way, an additional "safety buffer" can be implemented.

Alternatively or additionally, it is also conceivable that if the difference between $n_{greif}$ and $n_{erf}$ is greater than a threshold $n_s$, only the number $n_s$ is activated as ntest suction points. Accordingly, ntest=min (ns; ngreif−nerf), where ns is a number greater than or equal to one. In this way, energy consumption and wear during the reference measurement can be reduced while still ensuring a sufficiently reliable risk assessment. Such an embodiment of the method can be particularly advantageous if the vacuum gripper is designed in such a way that a change ΔpU in the negative pressure within the suction flow path, which occurs when an additional suction point is activated, decreases as the number of already activated suction points increases.

As mentioned above, $n_{erf}$ can be determined depending on one or more boundary conditions. In particular, $n_{erf}$ may be determined depending on the weight of the gripping object (in particular, the heavier the gripping object, the greater $n_{erf}$). Alternatively or additionally, $n_{erf}$ can be determined depending on the material of the gripping object (e.g., for porous materials, the number $n_{erf}$ may be greater than for suction-tight materials). Alternatively or additionally, $n_{erf}$ can be determined depending on a required holding force, e.g., depending on expected acceleration forces or processing forces during a work process carried out after applying suction to the gripping object.

The number $n_{greif}$ and in particular the specific selection of $S_{greif}$ suction points may be determined depending on a geometry and optionally the weight of the gripping object. For example, $n_{greif}$ Or $S_{greif}$ may be determined depending on an outer contour of the gripping object. As mentioned above, $n_{erf}$ may correspond to the maximum possible number of suction points by means of which the gripping object can be gripped due to its geometry. As an advantageous development, the vacuum handling device may comprise a detection device, e.g., a camera, for capturing an image of the gripping object. It is conceivable, for example, that the method comprises capturing an image of the gripping object and then determining a geometry, in particular an outer contour and/or inner contour, of the gripping object, for example using image processing methods.

The invention also relates to a vacuum handling device having features of claim 7. The vacuum handling device is designed in particular to carry out the method described above. The vacuum handling device comprises a vacuum gripper with a plurality of suction points that can be activated individually, i.e., independently of one another. The vacuum gripper is designed in such a way, in particular fluidically designed, that during open suction without a gripping object, the negative pressure prevailing in the suction flow path depends on the number of activated suction points, wherein the same number of activated suction points—regardless of which suction points from the plurality of suction points are activated—always leads to the same negative pressure in the suction flow path and wherein a different number of activated suction points leads to a different negative pressure in the suction flow path. In this respect, when open suction occurs without a gripping object, there is a clear correlation in particular between a number of activated suction points and a negative pressure that occurs in a suction flow path as a result of the activation of this number of suction points. In the present context, a negative pressure deviating by up to ±5%, preferably up to ±2%, is still referred to as "equal negative pressure".

The vacuum handling device further comprises a vacuum generating device for supplying the vacuum gripper with negative pressure, for example in the form of a blower, a pump, or an ejector, preferably in the form of an ejector. The vacuum generating device is fluidly connected to the vacuum gripper by a suction flow path in order to supply the vacuum gripper with negative pressure. The suction flow path leads in particular from the vacuum gripper, in particular from each suction point, in the direction of the vacuum generating device. The suction flow path may extend through fluid lines that connect the vacuum gripper to the vacuum generating device.

The vacuum handling device further comprises a control device for controlling the vacuum handling device. The control device is in particular configured to carry out the method described above. The control device preferably comprises a non-volatile storage device. In particular, control instructions can also be stored in the non-volatile storage device, which, when executed, cause the control device to carry out the method described above.

The advantages and optional features described above in connection with the method can also be used in the realization of the vacuum handling device, so that reference is made to the above disclosure in this respect in order to avoid repetition.

As an advantageous development, the vacuum gripper is designed in such a way that a change $\Delta pU_{0\rightarrow 1}$ in the negative pressure within the suction flow path, which occurs when, starting from an initial configuration in which no suction point is activated, a first suction point is activated, is greater than a change $\Delta pU_{1\rightarrow 2}$ in the negative pressure within the suction flow path, which occurs when an additional suction point is activated. In this way, it can be ensured that the difference between an activated suction point and a non-activated suction point is reliably detectable. This takes into account the consideration that, if only a single $S_{greif}$ suction point is available as the maximum suction point, a failed grip is critical, as there may then be no gripping force provided at all.

Furthermore, it may be advantageous if the vacuum gripper is designed in such a way that, as the number of already activated suction points increases, a change $\Delta pU_{x+1}$ in the negative pressure within the suction flow path, which occurs when an additional suction point is activated, decreases. Accordingly, for example, a change in $\Delta pU_{1+1}$ in the negative pressure within the suction flow path upon activation of a second suction point (starting from a configuration with only one activated suction point) must be greater than a change $\Delta pU_{2+1}$ in the negative pressure within the suction flow path upon activation of a third suction point (starting from a configuration with two activated suction points).

Furthermore, it can be advantageous if the vacuum gripper is designed such that a change ΔpU in the negative pressure within the suction flow path, which occurs when a first or additional suction point is activated, exceeds 10 mbar, in particular exceeds 15 mbar, more particularly exceeds 20 mbar, in particular at least until a third of the existing suction points are extended. This facilitates reliable detection of a malfunction or mishandling of a suction point.

Preferably, the vacuum generating device is designed such that in an initial configuration in which no suction point is activated, the negative pressure in the suction flow path is constant, i.e., a deviation from a negative pressure target value is less than ±5%, in particular less than ±1%. When the vacuum generating device is designed as an ejector for generating negative pressure from compressed air, this can be achieved, for example, by changing an inlet (over) pressure of the compressed air at the ejector.

The vacuum gripper may be designed in different ways. For example, the vacuum gripper can comprise a plurality of suction openings which provide the suction points. The suction openings can be fluidically connected to and separated from the vacuum generating device individually, i.e., independently of one another, for example via a suitably designed valve device.

In an advantageous embodiment, the vacuum gripper can comprise a plurality of suction units that can be repeatedly extended and retracted, each forming a suction point. Each suction unit may, for example, comprise a piston that can be displaced within a main body of the vacuum gripper and has a suction body arranged thereon, such as an elastomer suction body. In the extended configuration of the suction unit, the suction point can then be activated; i.e., inflow of suction air through the suction unit, in particular through the suction body and the piston, can be enabled. In the retracted configuration, the suction point may be deactivated; i.e., in particular, inflow of suction air through the suction unit may be interrupted. Such a design has the advantage that the activated suction points protrude above the surrounding (deactivated) suction points, and therefore the vacuum gripper can easily contact the gripping object selectively with the activated suction points (wear reduction).

The invention also relates to a vacuum gripper for use in a vacuum handling device described above.

The invention is explained in more detail below with reference to the figures. In the drawings.

In the following description and in the figures, identical reference signs are in each case used for identical or corresponding features.

Figure 1:
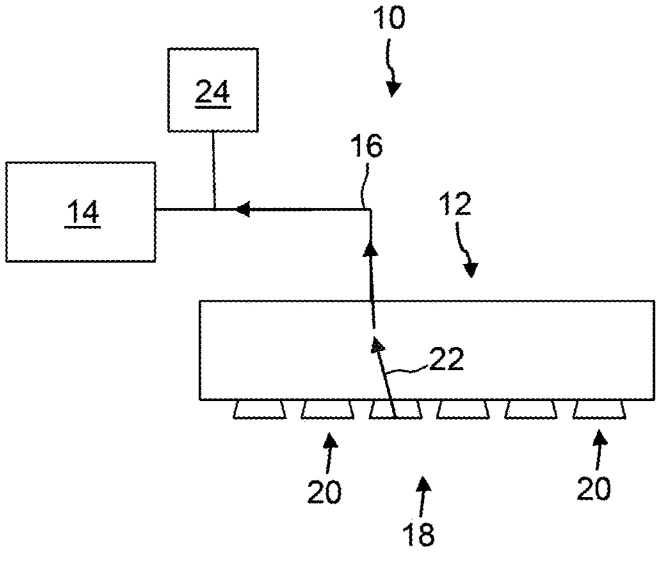
FIG. 1 is a simplified schematic illustration of a vacuum handling device.
Figure 2:
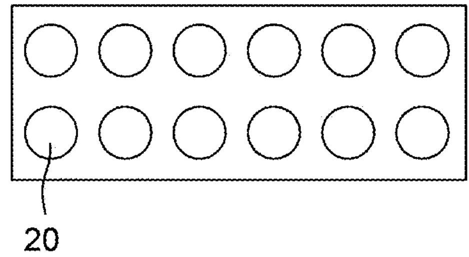
FIG. 2 shows the vacuum gripper of the vacuum handling device according to FIG. 1 in a bottom view.

FIG. 1 shows a simplified schematic representation of a vacuum handling device, which is designated throughout by reference sign 10. The vacuum handling device 10 comprises a vacuum gripper 12 and a vacuum generating device 14 for supplying the vacuum gripper 12 with negative pressure. The vacuum generating device 14 is fluidly connected to the vacuum gripper 12 via a fluid line 16.

The vacuum generating device 14 can be designed in different ways, for example as a blower or pump. The vacuum generating device 14 is preferably an ejector for generating negative pressure from compressed air.

The vacuum gripper 12 comprises, on a suction side 18, a plurality of suction points 20 for picking up a gripping object by suction force. In the example, the vacuum gripper 12 comprises twelve suction points 20, which are arranged in a regular grid pattern. In embodiments not shown, the configuration of the suction points 20 may vary. For example, a greater or lesser number of suction points 20 may be provided. The suction points 20 may also be arranged in an irregular pattern.

The suction points 20 can be supplied with negative pressure via the vacuum generating device 14. A suction flow path 22 (indicated by the arrows in FIG. 1 by way of example) extends, by way of example, from the suction points 20 through the fluid line 16 to the vacuum generating device 14.

The vacuum gripper 20 is configured such that the suction points 20 can be activated and deactivated individually, i.e., independently of one another (when activated, they generate suction; when deactivated, they do not generate suction). This can be implemented in different ways. For example, it is conceivable for the vacuum gripper 12 to comprise a valve device (not shown) configured to open or close a flow path between the suction points 20 and a negative pressure connection connected to the vacuum generating device 14. An exemplary implementation is described below with reference to FIGS. 3 and 4. However, the invention is not limited to this embodiment.

As mentioned above, the vacuum gripper 20 is also designed such that, during open suction without a gripping object, the negative pressure prevailing in the suction flow path depends on the number of activated suction points, wherein the same number of activated suction points-regardless of which suction points from the plurality of suction points are activated-always leads to the same negative pressure in the suction flow path and wherein a different number of activated suction points leads to a different negative pressure in the suction flow path.

The vacuum handling device 10 further comprises a sensor device 24 for measuring a negative pressure in the suction flow path 22. In the example, the sensor device 24 is designed to measure a negative pressure in the fluid line 16. In embodiments not shown, the sensor device 24 can also be configured to measure the negative pressure in a suction area of the vacuum generating device 14 and/or in the vacuum gripper 12. The sensor device 24 may comprise one or more pressure sensors.

The vacuum handling device 10 may optionally also comprise a manipulator (not shown), e.g., a robot, for moving the vacuum gripper 12.

The vacuum handling device 10 can optionally also have a detection device, e.g., a camera, for detecting a gripping object.

The vacuum handling device 10 preferably further comprises a control device (not shown) for controlling the vacuum handling device 10, in particular the vacuum generating device 14 and the vacuum gripper 12. For example, the control device can be configured to control a valve device of the vacuum gripper 12 in order to activate the suction points 20 as required. The control device preferably comprises a non-volatile storage device in which control instructions are stored which, when executed by the control device, in particular by a data processing system of the control device, cause the control device to control the vacuum handling device 10, in particular to carry out the method explained below.

Figure 3:
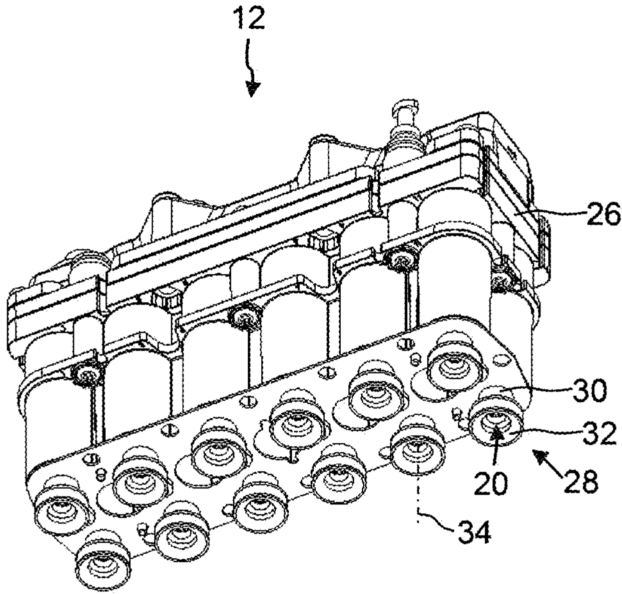
FIG. 3 is an outline of an exemplary embodiment of a vacuum gripper in a perspective view.

FIG. 3 shows an outline of an exemplary configuration of a vacuum gripper 12. The vacuum gripper 12 comprises a gripper main body 26 and a plurality of suction units 28, in the example shown twelve, each providing a suction point 20.

Each suction unit 28 comprises a piston 30 and a suction body 32, e.g., a bellows suction cup, which is movably coupled to the piston 30. The suction unit 28 is mounted on the gripper main body 26 so as to be displaceable along a lifting axis 34 and is adjustable in an extension direction 36 (cf. FIG. 4) and in a retraction direction 38 opposite to the extension direction 36, and therefore the suction unit 28 can assume a retracted passive configuration relative to the gripper main body 26 (cf. FIG. 4 left) and an extended active configuration relative to the gripper main body 26 (cf. FIG. 4 right).

Figure 4:
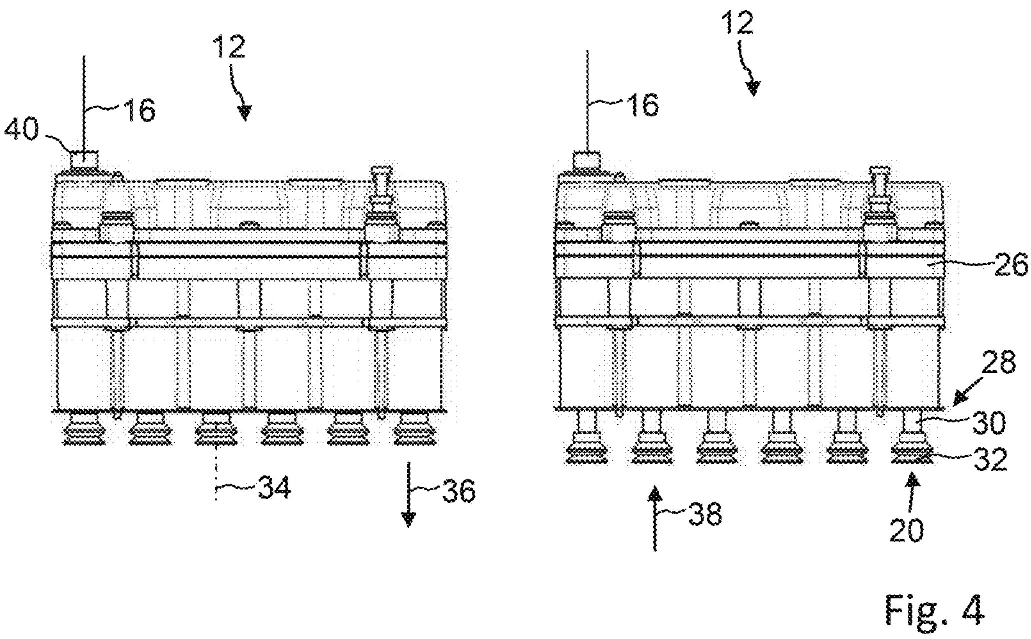
FIG. 4 shows the vacuum gripper according to FIG. 3 in different functional positions in a side view.

As can be seen from FIG. 4, the suction units 28 are preferably mounted on the gripper main body 26 such that the lifting axes 34 of the suction units 28 run parallel to one another.

The suction units 28 are designed such that, in the retracted passive configuration, the inflow of suction air through the suction unit 28 is blocked (i.e., the suction point 20 is deactivated), and in the extended active configuration, the inflow of suction air through the suction unit 28 is enabled (i.e., the suction point 20 is activated).

Activation or deactivation of the suction units 28/suction points 20 may be implemented by enabling or interrupting a supply of negative pressure to the suction units 28. For example, it is conceivable that the vacuum gripper 12 has one or more valve devices (not shown) for controlling a supply of negative pressure to the suction units 28. For example, the vacuum gripper 12 may have a negative pressure connection 40, via which the vacuum gripper 12 can be supplied with negative pressure. The valve device can then be designed, for example, to individually open or close a flow connection between the negative pressure connection 40 and the suction units 28.

The vacuum gripper 12 may, in particular, also comprise an electrical interface via which, for example, the valve devices can be supplied with power. Furthermore, it is conceivable that control commands are transmitted via the electrical interface from a higher-level control device, in particular the control device of the vacuum handling device, to the valve devices.

The vacuum gripper 12 may additionally comprise its own control device (not shown) for controlling the valve devices. The electrical interface can then be designed, for example, to connect the integrated control device to the higher-level control device.

Figure 5:
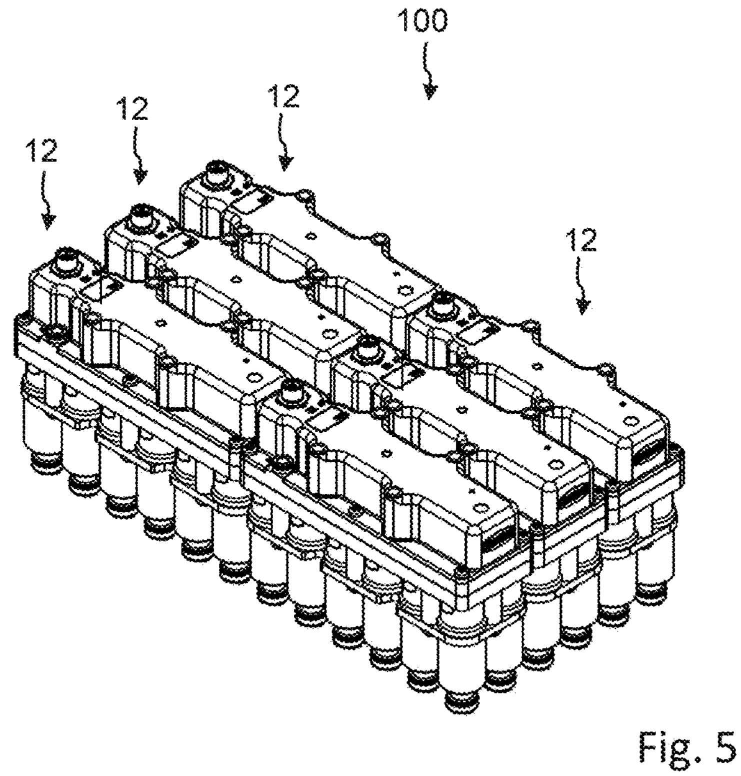
FIG. 5 shows a gripping device comprising several vacuum grippers according to FIG. 3.

It is conceivable that several of the vacuum grippers 12 described above are combined to form a higher-level vacuum gripping device 100. An exemplary embodiment of such a vacuum gripping device is shown in FIG. 5 and designated throughout with the reference sign 100. As can be seen from FIG. 5, the vacuum grippers 12 in the vacuum gripping device 100 are arranged in particular next to one another such that a flat suction surface is formed.

An exemplary method for operating a vacuum handling device 10 described above is explained below with reference to FIG. 6. According to the method, a gripping object 42 is to be picked up through suction by means of the vacuum gripper 12 and, if necessary, moved.

Figure 6:
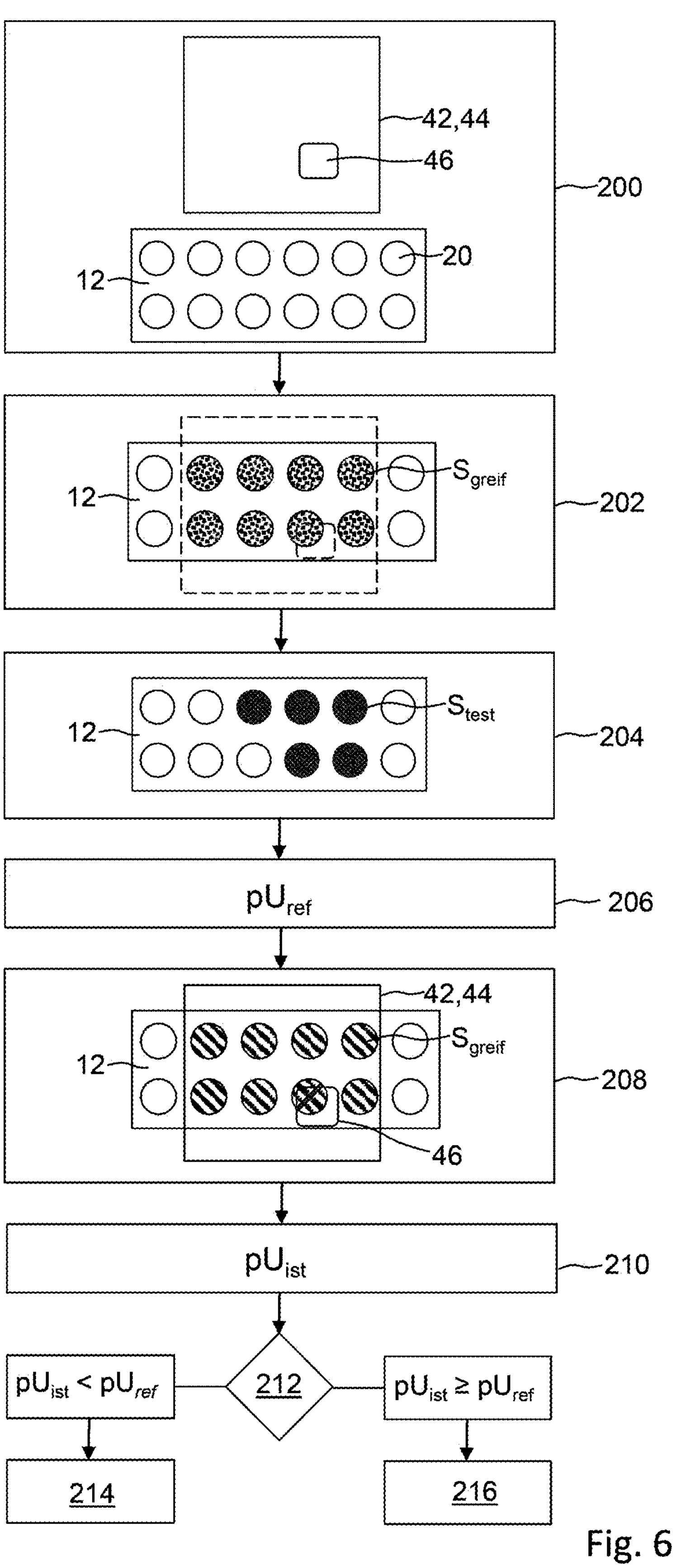
FIG. 6 is a flowchart for explaining an exemplary method for handling a gripping object by means of the vacuum handling device according to FIG. 1.

According to the method, the vacuum handling device 10 and the gripping object 42 are first provided (see block 200 in FIG. 6). By way of example, the method is described based on the vacuum gripper 12 according to FIG. 1, which comprises twelve suction points 20. However, the method is not limited to such a configuration of the vacuum gripper 12. In particular, it is also conceivable that a vacuum gripping device 100 according to FIG. 5 is used, comprising a plurality of vacuum grippers 12.

The gripping object 42 is designed, by way of example, as a flat material, in particular sheet metal 44. To explain certain aspects of the method, the gripping object 42 comprises, by way of example, a local recess 46. In embodiments not shown, the gripping object 42 may also assume any other configuration.

In a further step (see block 202 in FIG. 6), a number $n_{greif}$ of suction points 20 is determined, and in particular a specific selection of suction points $S_{greif}$ is identified, by means of which the gripping object 42 is to be gripped. The number $n_{greif}$ and the configuration of the suction points $S_{greif}$ can be determined, in particular, depending on a geometry, in particular an outer contour, of the gripping object 42. For example, the suction points $S_{greif}$ may correspond to the maximum possible number of suction points 20 that can be placed on the gripping object 42. As a further boundary condition, a desired orientation of the gripping object 42 on the vacuum gripper 12 may be taken into account when determining the suction points $S_{greif}$.

As mentioned above, for example, the gripping object 42 can be characterized by means of a detection device, for example comprising a camera, and in particular, an outer contour and/or an inner contour of the gripping object 42 can be determined by means of image processing methods.

In the specific example according to FIG. 6, the gripping object 42 is to be gripped with eight suction points (marked with dots in block 202), which in this example corresponds to the maximum possible number of suction points 20 that can contact the gripping object 42 due to its size. Accordingly, $n_{greif}$ is eight.

Furthermore, a number $n_{erf}$ is determined or provided, which indicates the minimum number of suction points 20 required to securely grip the gripping object 42. As mentioned above, the number $n_{erf}$ may be determined in particular depending on a weight of the gripping object 42 and optionally under further boundary conditions, such as expected acceleration or processing forces during a work process to be carried out. In this example, three suction points 20 are required for secure gripping. Accordingly, $n_{erf}$ is three.

In a further step (block 204 in FIG. 6), a number $n_{test}$ of suction points $S_{test}$ is activated without applying suction to a gripping object (open suction). The number $n_{test}$ corresponds to the difference between $n_{greif}$ and $n_{erf}$, which in the specific example according to FIG. 6 results in: $n_{test}$=8−3=5. The activated and open-suction (test) suction points $S_{test}$ are shown in black in FIG. 6. The selection of activated (test) suction points $S_{test}$ shown in FIG. 6 is merely by way of example. As mentioned above, any five suction points 20 may be activated. In particular, the test suction points $S_{test}$ do not necessarily have to be a subset of the suction points $S_{greif}$.

When the suction points $S_{test}$ are activated, the sensor device 24 measures the negative pressure $pU_{test}$ that occurs in the suction flow path 22 (e.g., in the fluid line 16) (block 206 in FIG. 6). The negative pressure $pU_{test}$ thus represents the negative pressure that would occur if, during a subsequent gripping process of the gripping object 42 using the (in this example, eight) suction points $S_{greif}$, five of the eight activated suction points $S_{greif}$ were unable to generate suction or at least did not reliably generate suction; in other words, only $n_{erf}$ (in this example: three) of the $n_{greif}$ (in this example: eight) activated suction points $S_{greif}$ would actually apply suction to the gripping object 42. The negative pressure value $pU_{test}$ therefore represents a threshold negative pressure, which must be at least achieved during the later activation of the suction points $S_{greif}$ to ensure that the gripping object 42 is securely gripped.

The negative pressure value $pU_{test}$ is then used as a reference negative pressure $pU_{ref}$ stored in the non-volatile storage device of the control device.

As mentioned above, it is alternatively conceivable that the negative pressure value $pU_{test}$, reduced by a correction factor $pU_{korr}$, is stored as reference negative pressure $pU_{ref}$.

It is also conceivable that steps 204 and 206 are not carried out, but instead, for each number of activated suction points 20, a reference negative pressure value $pU_{ref}$ is already stored in a database in the storage device (see above).

In a further step (block 208 in FIG. 6), the suction points $S_{greif}$ are then activated and the gripping object 42 is picked up through suction (to distinguish from open suction according to block 204, the suction points $S_{greif}$ are shown in dashed lines in block 208).

Subsequently—after applying suction to the gripping object 42—the negative pressure $pU_{ist}$ in the suction flow path 22 is again measured by means of the sensor device 24 (block 210 in FIG. 6).

This negative pressure value $pU_{ist}$ is then compared with the reference negative pressure value $pU_{ref}$ (see block 212 in FIG. 6).

If the negative pressure value $pU_{ist}$ is smaller than the reference negative pressure value $pU_{ref}$, it can be concluded that fewer than the required number $n_{erf}$ of suction points 20 are applying suction to the gripping object 42 (i.e., more suction points 20 than $n_{test}$ are not generating suction). In this case, an error signal can optionally be issued (see block 214 in FIG. 6). For example, the error signal can cause the control device to abort a suction process.

If the negative pressure value $pU_{ist}$ is equal to or greater than the reference negative pressure value $pU_{ref}$, it can be concluded that sufficient suction points 20, i.e., a number corresponding to $n_{erf}$ or a number greater than $n_{erf}$ of suction points, are actually applying suction to the gripping object 42, thus securely gripping the gripping object 42. In this case, an enable signal can optionally be issued. The enable signal can, for example, cause the control device to start a handling process (e.g., comprising the movement of the gripping object 42 held on the vacuum gripper 12).

In the example shown in FIG. 6, only one of the suction points $S_{greif}$ fails to generate suction or does so unreliably, namely the suction point positioned at the recess 46 (marked with a black cross in block 208). In this example, seven of the eight activated suction points $S_{greif}$ generate suction reliably, i.e., more than absolutely necessary (more than $n_{erf}$). Consequently, the negative pressure value $pU_{ist}$ in the example is greater than the negative pressure value $pU_{ref}$ and an enable signal is optionally issued.

The invention claimed is:

1. A method for handling a gripping object by means of a vacuum handling device, wherein the vacuum handling device includes:

- a vacuum gripper with a plurality of individually activatable suction points;
- a vacuum generating device which is connected to the vacuum gripper by a suction flow path in order to supply the vacuum gripper with negative pressure, wherein the vacuum gripper, for carrying out the method, is designed such that during open suction without a gripping object, the negative pressure prevailing in the suction flow path depends on the number of activated suction points, and the same number of activated suction points—regardless of which suction points from the plurality of suction points are activated—always leads to the same negative pressure in the suction flow path, the method comprising:

- providing a reference negative pressure value $pU_{ref}$ in a non-volatile storage device, wherein the reference negative pressure value $pU_{ref}$ represents a negative pressure $pU_{test}$ that occurs when a number $n_{test}$ of suction points is activated during open suction without a gripping object in the suction flow path, $n_{test}$ is less than or equal to the difference between $n_{greif}$ and $n_{erf}$,
- $n_{greif}$ represents the number of suction points $S_{greif}$ used to grip the gripping object through suction, and
- $n_{erf}$ represents the minimum number of suction points required to securely hold the gripping object on the vacuum gripper;
- activating the suction points Sgreif and applying suction to the gripping object; and
- measuring a negative pressure value $pU_{ist}$, which represents a negative pressure that occurs in the suction flow path after suction has been applied to the gripping object with the suction points Sgreif, and comparing the negative pressure value $pU_{ist}$ with the reference negative pressure value $pU_{ref}$.

2. The method according to claim 1, wherein providing the reference negative pressure value $pU_{ref}$ comprises, immediately before activation of the suction points $S_{greif}$:

- activating a number of suction points $S_{test}$ corresponding to $n_{test}$ to apply suction without a gripping object,
- measuring a negative pressure value $pU_{test}$, which represents a negative pressure that occurs in the suction flow path after activation of the suction points $S_{test}$, and storing this negative pressure value $pU_{test}$, or this negative pressure value $pU_{test}$ reduced by a correction factor $pU_{korr}$ as the reference negative pressure value $pU_{ref}$ in the storage device.

3. The method according to claim 1, wherein, if the difference of $n_{greif}$ and $n_{erf}$ is greater than a threshold $n_s$, only the number $n_s$ of suction points $S_{test}$ is activated.

4. The method according to claim 1, wherein, when the negative pressure value $pU_{ist}$ is lower than the reference negative pressure value $pU_{ref}$, an error signal is issued.

5. The method according to claim 1, wherein $n_{erf}$ is determined depending one or more of the following boundary conditions:

a weight of the gripping object; and/or a material of the gripping object; and/or expected acceleration forces or processing forces during a work process carried out after applying suction to the gripping object.

6. The method according to claim 1, wherein $n_{greif}$ and $S_{greif}$ is determined depending on a geometry of the gripping object.

7. The vacuum handling device, for carrying out the method according to claim 1, the vacuum handling device comprising:

the vacuum gripper with a plurality of individually activatable suction points;

the vacuum generating device which is connected to the vacuum gripper by the suction flow path in order to supply the vacuum gripper with negative pressure, and a control device for controlling the vacuum handling device, wherein the vacuum gripper is designed such that during open suction without the gripping object, the negative pressure prevailing in the suction flow path depends on the number of activated suction points, wherein the same number of activated suction points—regardless of which suction points from the plurality of suction points are activated—always leads to the same negative pressure in the suction flow path, and wherein the control device is configured to carry out the method according to claim 1.

8. The vacuum handling device according to claim 7, wherein the vacuum gripper is designed such that a change $\Delta pU_{0\rightarrow 1}$ in the negative pressure within the suction flow path, which occurs when, starting from an initial configuration in which no suction point is activated, a first suction point is activated, is greater than a change $\Delta pU_{1\rightarrow 2}$ in the negative pressure within the suction flow path, which occurs when an additional suction point is activated.

9. The vacuum handling device according to claim 8, wherein the vacuum gripper is designed such that a change $\Delta pU_{x+1}$ in the negative pressure within the suction flow path, which occurs when an additional suction point is activated, decreases as the number of already activated suction points increases.

10. The vacuum handling device according to claim 9, wherein the vacuum gripper is designed such that a change $\Delta pU_{x+1}$ in the negative pressure within the suction flow path, which occurs when a suction point is activated, exceeds 10 mbar, in particular exceeds 15 mbar, more particularly exceeds 20 mbar, at least until a third of the existing suction points are extended.

11. The vacuum handling device according to claim 10, wherein the vacuum generating device is designed such that, in an initial configuration in which no suction point is activated, the negative pressure within the suction flow path is constant.

12. The vacuum handling device according to claim 11, wherein the vacuum gripper comprises a plurality of repeatedly extendable and retractable suction units, each forming a suction point, wherein the suction point is activated in the extended configuration of the suction unit and deactivated in the retracted configuration.

13. A suction gripper for use in the vacuum handling device according to claim 7.

* * * * *